(12) United States Patent
Huang et al.

(10) Patent No.: US 11,014,079 B2
(45) Date of Patent: May 25, 2021

(54) HYDROGEN GENERATION FROM FORMIC ACID CATALYZED BY A METAL COMPLEX UNDER AMINE-FREE AND AQUEOUS CONDITIONS

(71) Applicant: King Abdullah University of Science and Technology, Thuwal (SA)

(72) Inventors: Kuo-Wei Huang, Thuwal (SA); Chao Guan, Thuwal (SA); Yupeng Pan, Thuwal (SA); Jinsong Hu, Thuwal (SA); Huaifeng Li, Thuwal (SA)

(73) Assignee: KING ABDULLAH UNIVERSITY OF SCIENCE AND TECHNOLOGY, Thuwal (SA)

(*) Notice: Subject to any disclaimer, the term of this patent is extended or adjusted under 35 U.S.C. 154(b) by 134 days.

(21) Appl. No.: 16/314,572

(22) PCT Filed: Jun. 28, 2017

(86) PCT No.: PCT/IB2017/053881
§ 371 (c)(1),
(2) Date: Dec. 31, 2018

(87) PCT Pub. No.: WO2018/002850
PCT Pub. Date: Jan. 4, 2018

(65) Prior Publication Data
US 2019/0143310 A1    May 16, 2019

Related U.S. Application Data

(60) Provisional application No. 62/356,144, filed on Jun. 29, 2016.

(51) Int. Cl.
*B01J 31/22* (2006.01)
*C07F 15/00* (2006.01)
(Continued)

(52) U.S. Cl.
CPC ....... *B01J 31/2295* (2013.01); *B01J 31/1815* (2013.01); *C01B 3/22* (2013.01);
(Continued)

(58) Field of Classification Search
None
See application file for complete search history.

(56) References Cited

FOREIGN PATENT DOCUMENTS

| CN | 105772090 A | 7/2016 |
|---|---|---|
| JP | 2013193983 A | 9/2013 |

OTHER PUBLICATIONS

International Search Report and Written Opinion for PCT/IB2017/053881 dated Nov. 11, 2017.
(Continued)

*Primary Examiner* — Wyatt P McConnell
(74) *Attorney, Agent, or Firm* — Billion & Armitage

(57) ABSTRACT

The present invention provides a class of catalyst compounds that can safely and effectively release hydrogen gas from a chemical substrate without producing either noxious byproducts or byproducts that will deactivate the catalyst. The present invention provides catalysts used to produce hydrogen that has a satisfactory and sufficient lifespan (measured by turnover number (TON)), that has stability in the presence of moisture, air, acid, or impurities, promote a rapid reaction rate, and remain stable under the reaction conditions required for an effective hydrogen production system. Described herein are compounds for use as catalysts, as well as methods for producing hydrogen from formic acid and/or a formate using the disclosed catalysts. The methods include contacting formic acid and/or a formate with a catalyst as described herein, as well as methods of producing formic acid and/or a formate using the disclosed catalyst and methods for generating electricity using the catalysts described herein.

19 Claims, 9 Drawing Sheets

(51) Int. Cl.
    *B01J 31/18*       (2006.01)
    *C01B 3/22*        (2006.01)
    *H01M 8/0612*    (2016.01)

(52) U.S. Cl.
    CPC ....... *C07F 15/0046* (2013.01); *H01M 8/0618* (2013.01); *B01J 2231/763* (2013.01); *B01J 2531/821* (2013.01); *C01B 2203/0277* (2013.01); *C01B 2203/067* (2013.01); *C01B 2203/1064* (2013.01); *C01B 2203/84* (2013.01)

(56) References Cited

OTHER PUBLICATIONS

Wang, et al., "Unprecedentedly High formic Acid Dehydrogenation Activity on an Iridium Complex with an N, N'-Diimine Ligand in Water", Chem. Eur.J., 21,, 2015, 12592-12595.

Adam, et al., "Chiral pyridylimidazolines: synthesis, arene ruthenium complexes and application in asymmetric catalysis", Royal Chemical Society. Journal. Perkin Transactions 1, No. 13, Jan. 1, 2001, pp. 1500-1503.

Amaia, et al., "Influence of Pyridine-Imidazoline Ligands on the Reactivity of Palladium-Methyl Complexes with Carbo Monoxide", Organometallics, vol. 21, No. 26, Dec. 1, 2002, pp. 5820-5829.

Davenport, et al., "Chiral pyridine imidazolines from C1 symmetric diamines: Synthesis, arene ruthenium complexes and application as asymmetric catalysis for Diels-Alder reactions", Journal of Organometallic Chemistry, vol. 691, Apr. 29, 2006, pp. 3445-3450.

Yang, et al., "Iridium-catalyzed highly efficient chemoselective reduction of aldehydes in water using formic acid as the hydrogen source", Green Chem; vol. 19, Jun. 14, 2017, pp. 3296-3301.

A

B

HYDROGEN GENERATION FROM FORMIC ACID CATALYZED BY A METAL COMPLEX UNDER AMINE-FREE AND AQUEOUS CONDITIONS

RELATED APPLICATION DATA

This application claims the benefit of U.S. Provisional Patent Application Ser. No. 62/356,144, filed Jun. 29, 2016.

TECHNICAL FIELD

The present invention relates generally to catalysts for hydrogen gas generation and uses thereof.

BACKGROUND OF THE INVENTION

The background of this invention will address general topics involving hydrogen, formic acid and catalysts.

Hydrogen

Hydrogen is the first chemical element in the periodic table and with an atomic weight of approximately 1.008, it is the lightest element on the table. Hydrogen in the monatomic form (H) is the most abundant chemical in the universe, constituting around 75% of the elemental mass of the universe, making up a large portion of the mass of stars, gas planets, and molecular clouds. On Earth, hydrogen is the third most abundant element, with three naturally occurring isotopes, protium (abbreviated $^1H$), deuterium (abbreviated $^2H$ or D) and tritium (abbreviated $^3H$ or T).

The most abundant isotope of hydrogen (protium) has one proton, one electron and no neutrons, accounting for more than 99.98% of the hydrogen on earth. Deuterium is a less common isotope of hydrogen with one proton, one electron and one neutron, accounting for only around 0.0156% of earth's hydrogen. Tritium, a very rare hydrogen isotope, has two neutrons in the atom's nucleus, and accounts for an estimated one billionth of a billionth percent of hydrogen atoms. The primary difference between the three isotopes is mass, based on the presence or absence of the neutrons. Because of this mass differential, when deuterium (D) is substituted for hydrogen (H) in chemical compounds, it provides a means for hydrogen to be tracked through chemical reactions for analysis of reaction mechanisms and rate determining steps (RDS).

Under normal conditions, elemental hydrogen exists as a homonuclear diatomic gas having two hydrogen atoms covalently bonded together, represented by the formula $H_2$. The gas is odorless, colorless, and tasteless. Hydrogen is lighter than air, but it is also highly flammable in air. Being lighter than air makes hydrogen an attractive choice for applications requiring buoyancy in air; however, as evidenced by the explosion of the Hindenburg airship in 1937, use of hydrogen in buoyant applications can be extremely hazardous. While the flammability of hydrogen makes it unsuitable for airships, this flammability, along with the relative abundance of the gas, does make it a promising choice for energy production.

Hydrogen is a clean energy carrier that produces water as the only exhaust when combusted in engines or fuel cells. Notably, hydrogen has been used as a fuel to propel rockets and the space shuttle into orbit, and since no hazardous or radioactive materials are produced in the combustion of the hydrogen, and the water produced as a byproduct is pure enough to be useable by crews on the space shuttles.

Fuel cells utilizing hydrogen are a promising technology for use as a source of power for buildings, and potentially for electric motors propelling vehicles. Electricity, heat, and water can be produced through the combining of hydrogen and oxygen. Fuel cells are often compared to batteries in that both convert the energy produced by a chemical reaction into usable electric power. One advantage of fuel cells is the ability to produce electricity as long as fuel (hydrogen) is supplied, without losing charge. Potentially, hydrogen ($H_2$) has a critical role in the future of renewable energy technologies.

While hydrogen is abundant on Earth, it is generally found in combination with other elements, such as carbon and oxygen, and must be separated from the compounds to be used for fuel. Hydrogen for fuel use can be produced from numerous and diverse processes. Electrolysis of water, where an electrical current is used to separate the hydrogen from the oxygen, is one means of producing hydrogen, but tends to be costly. Gasification of charcoal, where very high temperatures are used to release hydrogen from the carbon and water charcoal components, is another means for producing hydrogen, but requires a large input of energy to reach the effective temperature. An industrial means of hydrogen production is a natural gas reforming process, where methane ($CH_4$) is exposed to heated steam to produce hydrogen and carbon dioxide via a two-stage chemical reaction, however, this process requires natural gas as a starting material.

Formic Acid

Formic acid (FA), an adduct of carbon dioxide ($CO_2$) and hydrogen, has the formula $HCO_2H$, (alternately HCOOH) and is a major byproduct of the oxidation of biomass. Formic acid is a highly accessible, economical, nonflammable commodity liquid that is safe to transport and store, and as such, it has been considered as a potential liquid source and storage material for hydrogen. Dehydration of formic acid yields only gases—hydrogen ($H_2$) and carbon dioxide ($CO_2$)—which can be easily separated.

Formic acid's volumetric hydrogen capacity reaches 53 g $H_2$/L, which is equivalent to an energy density of 1.77 kW·h/L. Thus, formic acid is an attractive high density energy source for automotive and mobile applications. A sustainable and reversible energy storage and utilization cycle can be accomplished by combining $CO_2$ and $H_2$ into formic acid to store hydrogen and remove $CO_2$, and decomposing formic acid to release hydrogen.

The decomposition of formic acid has been shown to release hydrogen under mild conditions. However, this mild approach faces challenges when considered on a scale appropriate for industrially viable applications. In many existing systems, trace amounts of carbon monoxide (CO) are generated as a by-product, which can poison the formic acid or other material used to produce hydrogen in a hydrogen fuel cell, which can cause partial or total deactivation of the formic acid or other material used to produce hydrogen.

The lifetime of the formic acid or other material used to produce hydrogen (as indicated by the turnover number (TON)) is not satisfactory or sufficiently extended because of material instability due to moisture, air, acid, or other trace amounts of impurities which exist in most formic acid sources. Current sources and uses formic acid fail to provide formic acid that promotes a rapid reaction rate, possesses an acceptable lifetime (TON), or remains stable under the reaction conditions required for an effective hydrogen production system.

Catalysts

Catalysts are substances that increase the rate of a chemical reaction without undergoing permanent chemical change in the process. A certain amount of activation energy is required to start a chemical reaction, much the same as a spark is needed to start a fire. A catalyst works by providing an alternative route for a reaction to proceed which requires a lower amount of activation energy than the non-catalyzed reaction route. The energy barrier that must be overcome for the reaction to proceed is then lower in the catalyzed reaction than in the non-catalyzed reaction, allowing the reaction to proceed more rapidly.

Catalysts are of two general types—homogenous and heterogeneous. A homogenous catalyst is one where the catalyst is of the same phase as at least one of the reactants. A heterogeneous catalyst is in a phase that is different from any of the reactants.

Homogenous catalysts typically participate in one or more steps of the reaction mechanism, but are not part of the final product. The catalyst remains chemically unchanged after completion of the reaction. An example of a homogeneous catalyst involves an aqueous homogeneous catalyst added to an aqueous solution of reactants. In this type of catalysis, the catalyst interacts with the reactants forming intermediates that react more rapidly than the original reactants. The intermediates increase the interaction that can take place between reactants by providing a reaction route that requires less activation energy than if the catalyst was not present.

Heterogeneous catalysts typically involve a solid catalyst with liquid or gaseous reactants. These catalysts work by bringing the reactants close enough to one another to increase the interaction rate. Usually this happens when one or more of the reactants becomes adsorbed onto the surface of the catalyst, allowing the reactants to get close enough to facilitate interaction.

An example of a heterogeneous catalyst is a catalytic converter in an automobile. Carbon monoxide is a toxic by-product of the combustion reaction taking place in a gasoline engine, and can react spontaneously with oxygen to produce carbon dioxide; however, even though the reaction is spontaneous, the process is slow. A catalytic converter speeds up the process by providing a material which attracts the gases to the surface, usually a metal such as platinum. Once the carbon monoxide and oxygen are in close proximity, the reaction can proceed quickly enough to produce carbon dioxide, thereby reducing the amount of carbon monoxide exiting the exhaust system of the automobile.

Hydrogen ($H_2$) is a clean burning fuel that potentially has a critical role in the future of renewable energy technologies; however, there exists a need for catalyst compounds that can safely and effectively release hydrogen gas from a chemical substrate without producing either noxious byproducts or byproducts that will deactivate the catalyst. Also, there is a need for a source and use of formic acid or another material used to produce hydrogen that has a satisfactory and sufficient lifespan (measured by turnover number (TON)), that has material stability in the presence of moisture, air, acid, or impurities, promote a rapid reaction rate, and remain stable under the reaction conditions required for an effective hydrogen production system.

SUMMARY OF THE INVENTION

The present invention provides a class of catalyst compound that can safely and effectively release hydrogen gas from a chemical substrate without producing either noxious byproducts or byproducts that will deactivate the catalyst.

The present invention also fulfills the need for a source and use of formic acid or another material used to produce hydrogen that has a satisfactory and sufficient lifespan (measured by turnover number (TON)), that has material stability in the presence of moisture, air, acid, or impurities, promote a rapid reaction rate, and remain stable under the reaction conditions required for an effective hydrogen production system.

Catalysts and methods of using the catalysts to produce hydrogen from formic acid are described herein. A class of catalysts as described herein includes compounds of the following formula:

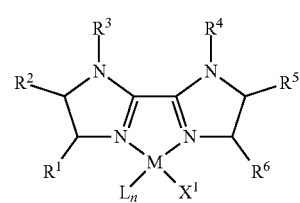

or a salt thereof, wherein L is a neutral ligand or an anionic ligand; M is a metal or a metal ion; n is 0, 1, or 2; $X^1$ is a halide, a hydride, or a formate ion, and $R^1$, $R^2$, $R^3$, $R^4$, $R^5$, and $R^6$ are each independently selected from hydrogen, substituted or unsubstituted alkyl, and substituted or unsubstituted aryl. The compound has the following formula:

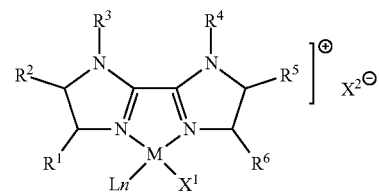

wherein $X^2$ is a halide. The metal or the metal ion comprises ruthenium (Ru) or iron (Fe). It is possible that $R^1$, $R^2$, $R^3$, $R^4$, $R^5$, and $R^6$ are each hydrogen. L can also be a substituted aryl (e.g., p-cymene). The compound has the following structure:

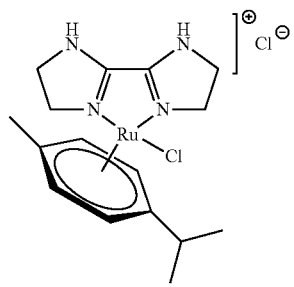

Catalysts as described herein includes compounds of the following formula:

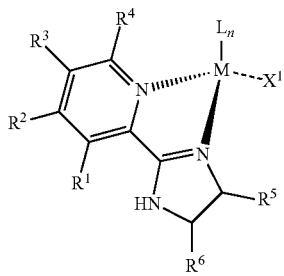

or a salt thereof, wherein L is a neutral ligand or an anionic ligand; M is a metal or a metal ion; n is 0, 1, or 2; $X^1$ is a halide, a hydride, or a formate ion, and R, $R^3$, $R^4$, $R^5$, and $R^6$ are each independently selected from hydrogen, substituted or unsubstituted alkyl, and substituted or unsubstituted aryl, and $R^2$ is selected from hydrogen, substituted or unsubstituted alkyl, and substituted or unsubstituted aryl, $N(CH_3)_2$, $NH_2$, $OH$, $CH_3O$, $C_2H_5O$, $CH_3$, F, I, $CF_3$, CN, or $NO_2$. The compound has the following formula:

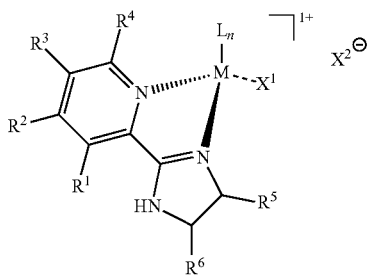

wherein $X^2$ is a halide. The metal or the metal ion comprises ruthenium (Ru) or iron (Fe). It is possible that $R^1$, $R^2$ $R^3$, $R^4$, $R^5$, and $R^6$ are each hydrogen. L can also be a substituted aryl (e.g., p-cymene). The compound has the following structure:

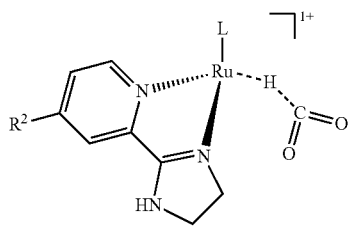

wherein L is a neutral ligand or an anionic ligand, and $R^2$ is $N(CH_3)_2$, $NH_2$, $OH$, $CH_3O$, $C_2H_5O$, $CH_3$, F, I, $CF_3$, CN, or $NO_2$.

Also described herein are methods of producing hydrogen from formic acid and/or a formate. A method of producing hydrogen from formic acid and/or a formate comprises contacting formic acid and/or a formate with a catalyst as described herein, wherein the contacting step produces hydrogen. The contacting step produces one or more additional gases. The one or more additional gases can comprise carbon dioxide. The one or more additional gases are substantially free from or free of carbon monoxide. The formate comprises sodium formate, potassium formate, and/or lithium formate. The contacting step is performed in the presence of a solvent.

The solvent comprises an aqueous solvent (e.g., water) or methanol. The solvent is substantially free from or free of organic solvents. The contacting step is substantially free from or free of amines. The contacting step can be performed at room temperature. The catalyst for use in the methods herein have a turnover number (TON) from about 500 to about 2,000,000 and/or a turnover frequency (TOF) of from about 5,000 h to about 100,000 $h^{-1}$.

Additionally described herein are methods of producing formic acid and/or a formate. A method of producing formic acid and/or a formate comprises contacting carbon dioxide and hydrogen with a catalyst as described herein. The contacting step is performed under increased pressure as compared to atmospheric pressure and the contacting step produces formic acid and/or a formate.

Further described herein are methods for generating electricity. A method for generating electricity as described herein comprises (a) providing a source of hydrogen comprising formic acid and/or a formate, a catalyst as described herein, a reaction chamber, and a fuel cell that generates electricity; (b) delivering the hydrogen source (e.g., formic acid and/or a formate) and the catalyst to the reaction chamber, wherein the catalyzed reaction in the reaction chamber causes the formic acid and/or formate to convert to hydrogen and carbon dioxide; and (c) delivering the converted hydrogen to the fuel cell to generate electricity.

The details of one or more embodiments are set forth in the description and drawings below. Other features, objects, and advantages will be apparent from the detailed description and drawings, and from the claims.

BRIEF DESCRIPTION OF THE DRAWINGS

The above, and other objects and advantages of the present invention will be understood upon consideration of the following detailed description taken in conjunction with the accompanying drawings, in which like reference characters refer to like parts throughout, and in which.

Figure 1:
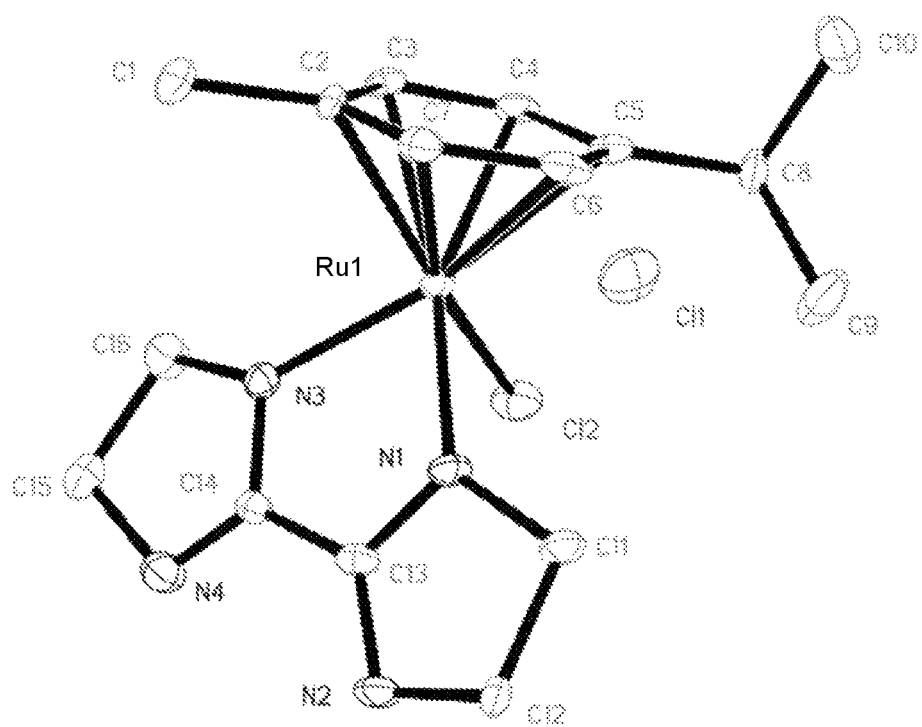
FIG. 1 is an X-ray diffraction crystallography structure of Compound 1/Complex 1.

While the invention is susceptible to various modifications and alternative forms, specific embodiments thereof have been shown by way of example in the drawings and are herein described in detail. It should be understood that the description herein of specific embodiments is not intended to limit the invention to the particular forms disclosed, but on the contrary, the intention is meant to cover all modifications, equivalents, and alternatives falling within the spirit and scope of the invention as defined by the appended claims.

DETAILED DESCRIPTION

The present invention provides a catalyst compound that can safely and effectively release hydrogen gas from a chemical substrate without producing either noxious byproducts or byproducts that will deactivate the catalyst. The present invention also fulfills the need for a source and use of formic acid or another material used to produce hydrogen that has a satisfactory and sufficient lifespan (measured by turnover number (TON)), that has material stability in the presence of moisture, air, acid, or impurities, promote a rapid reaction rate, and remain stable under the reaction conditions required for an effective hydrogen production system.

Hydrogen ($H_2$) is a clean burning fuel that potentially has a critical role in the future of renewable energy technologies. Described herein are compounds for use as catalysts, as well as methods for producing hydrogen from formic acid and/or a formate using the disclosed catalysts. The methods include contacting formic acid and/or a formate with a catalyst as described herein, as well as methods of producing formic acid and/or a formate using the disclosed catalyst and methods for generating electricity using the catalysts described herein. In these methods, water or methanol can be used as the solvent without any additional organic solvents.

Furthermore, no organic amine bases are required for the reaction and the reaction can be performed at room temperature. In addition, the conversion of formic acid to hydrogen proceeds without generating a substantial amount of or any carbon monoxide. Also provided herein are methods for producing formic acid and/or a formate from hydrogen and/or carbon dioxide using the catalysts described herein. Also described herein are methods for generating electricity by using the catalysts described herein.

Compounds

A class of catalysts described herein has a heterocyclic ligand selected from:

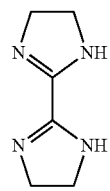

L1

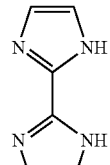

L2

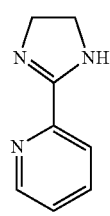

L3

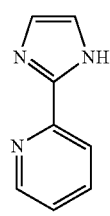

L4

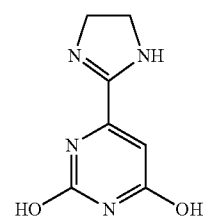

L5

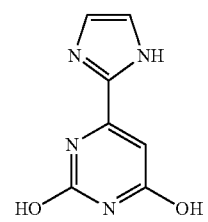

L6

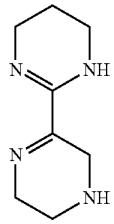

L7

L8

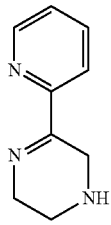

L9

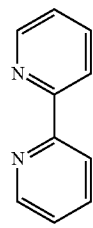

Ligands L1, L3, L5, L7 and L8 are non-aromatic ligands that maybe used in the catalysts. Ligands L2, L4, L6 and L9 are aromatic ligands that that may be used in the catalysts. Optionally, the ligand is L1 or L3.

Optionally, the class of catalysts is represented by Formula I:

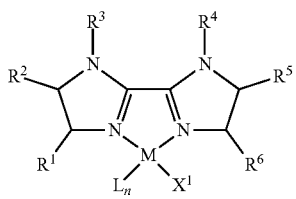

and salts thereof.

In Formula I, L is a neutral ligand or an anionic ligand. L can be a substituted aryl. L can be represented by the following structure:

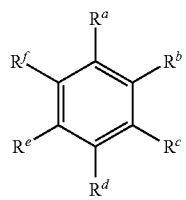

In this structure, $R^a$, $R^b$, $R^c$, $R^d$, $R^e$, and $R^f$ are each independently selected from hydrogen and substituted or unsubstituted alkyl. $R^a$ and $R^d$ are substituted or unsubstituted alkyl, and $R^b$, $R^c$, $R^e$, and $R^f$ are hydrogen. L can also be p-cymene.

Also in Formula I, M is a metal or a metal ion. The metal or metal ion can be a transition metal. For example, the metal or metal ion can be a group 4 metal or metal ion, a group 5 metal or metal ion, a group 6 metal or metal ion, a group 7 metal or metal ion, a group 8 metal or metal ion, a group 9 metal or metal ion, a group 10 metal or metal ion, or a group 11 metal or metal ion. The metal or metal ion includes ruthenium (Ru), iron (Fe), osmium (Os), hassium (Hs), iridium (Ir), palladium (Pd), and/or silver (Ag).

Additionally in Formula I, n is 0, 1, or 2.

Also, in Formula I, $R^1$, $R^2$, $R^3$, $R^4$, $R^5$, and $R^6$ are each independently selected from hydrogen, substituted or unsubstituted alkyl, and substituted or unsubstituted aryl. Optionally, one or more of $R^1$, $R^2$, $R^3$, $R^4$, $R^5$, and $R^6$ is hydrogen. Optionally, $R^1$, $R^2$, $R^3$, $R^4$, $R^5$, and $R^6$ are each hydrogen.

Further in Formula I, $X^1$ is a halide, a hydride, or a formate ion. $X^1$ can be chloride, bromide, or fluoride.

Formula I can be represented by Structure I-A:

Structure I-A

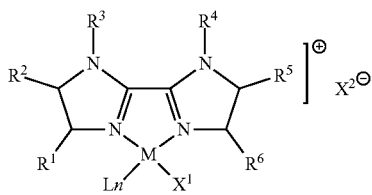

In Structure I-A, L, M, n, $R^1$, $R^2$, $R^3$, $R^4$, $R^5$, $R^6$, and $X^1$ are as defined above for Formula I.

Also in Structure I-A, $X^2$ is a halide. $X^2$ can be chloride, bromide, or fluoride.

By way of example, Formula I includes the following compound:

Compound 1 (Complex 1)

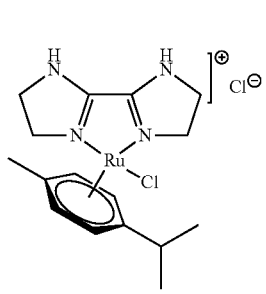

Optionally, the class of catalysts is represented by Formula II:

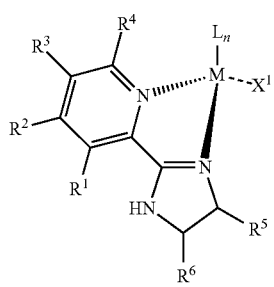

and salts thereof.

In Formula II, L is a neutral ligand or an anionic ligand. L can be a substituted aryl. L can be represented by the following structure:

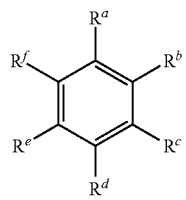

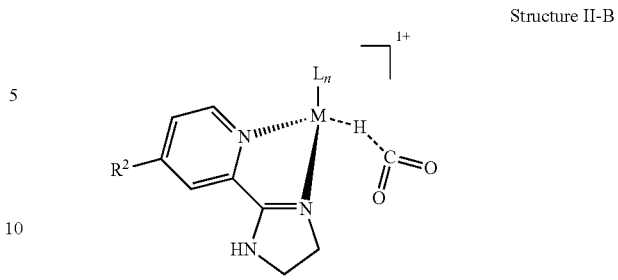

Structure II-B

In this structure, $R^a$, $R^b$, $R^c$, $R^d$, $R^e$, and $R^f$ are each independently selected from hydrogen and substituted or unsubstituted alkyl. $R^a$ and $R^d$ are substituted or unsubstituted alkyl, and $R^b$, $R^c$, $R^e$, and $R^f$ are hydrogen. L can also be p-cymene.

Also in Formula II, M is a metal or a metal ion. The metal or metal ion can be a transition metal. For example, the metal or metal ion can be a group 4 metal or metal ion, a group 5 metal or metal ion, a group 6 metal or metal ion, a group 7 metal or metal ion, a group 8 metal or metal ion, a group 9 metal or metal ion, a group 10 metal or metal ion, or a group 11 metal or metal ion. The metal or metal ion includes ruthenium (Ru), iron (Fe), osmium (Os), hassium (Hs), iridium (Ir), palladium (Pd), and/or silver (Ag).

Additionally in Formula II, n is 0, 1, or 2.

Also, in Formula II, R, $R^3$, $R^4$, $R^5$, and $R^6$ are each independently selected from hydrogen, substituted or unsubstituted alkyl, and substituted or unsubstituted aryl. Optionally, $R^2$ is selected from hydrogen, substituted or unsubstituted alkyl, and substituted or unsubstituted aryl, $N(CH_3)_2$, $NH_2$, OH, $CH_3O$, $C_2H_5O$, $CH_3$, F, I, $CF_3$, CN, or $NO_2$. One or more of $R^1$, $R^2$, $R^3$, $R^4$, $R^5$, and $R^6$ is hydrogen. Optionally, $R^1$, $R^2$, $R^3$, $R^4$, $R^5$, and $R^6$ are each hydrogen.

Further in Formula II, $X^1$ is a halide, a hydride, or a formate ion. $X^1$ can be chloride, bromide, or fluoride.

Formula II can be represented by Structure II-A:

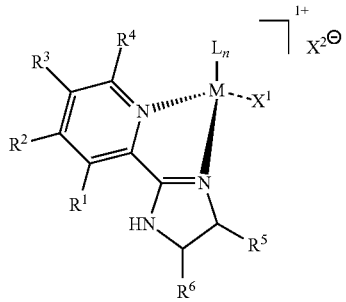

Structure II-A

In Structure II-A, L, M, n, $R^1$, $R^2$, $R^3$, $R^4$, $R^5$, $R^6$, and $X^1$ are as defined above for Formula II.

Also in Structure II-A, $X^2$ is a halide. $X^2$ can be chloride, bromide, or fluoride.

By way of example, Formula II includes the following Structure I-B:

In Structure II-B, $X^1$ is a formate ion, M is ruthenium, L is a neutral ligand or an anionic ligand. L can be a substituted aryl. L can also be p-cymene. $R^2$ can be hydrogen, substituted or unsubstituted alkyl, substituted or unsubstituted aryl, electron-donating substitutes: $N(CH_3)_2$, $NH_2$, OH, $CH_3O$, $C_2H_5O$, or $CH_3$, or electron-withdrawing substitutes: F, I, $CF_3$, CN, or $NO_2$. Optionally, R is $N(CH_3)_2$, $CH_3O$, $C_2H_5O$, or $CH_3$.

As used herein, the term alkyl includes straight-chain and branched-chain monovalent substituents. Examples include methyl, ethyl, isopropyl, isobutyl, and the like. A range of this group useful with the compounds and methods described herein includes $C_1$-$C_{20}$ alkyl. Additional ranges of these groups useful with the compounds and methods described herein include $C_1$-$C_{12}$ alkyl, $C_1$-$C_6$ alkyl, and $C_1$-$C_4$ alkyl.

Aryl molecules include, for example, cyclic hydrocarbons that incorporate one or more planar sets of, typically, six carbon atoms that are connected by delocalized electrons numbering the same as if they consisted of alternating single and double covalent bonds. An example of an aryl molecule is benzene. Aryl molecules can also include additional fused rings, for example, naphthalene and anthracene. The aryl molecules can be attached at any position on the ring, unless otherwise noted.

The alkyl and aryl molecules used herein can be substituted or unsubstituted. As used herein, the term substituted includes the addition of an alkoxy, aryloxy, amino, alkyl, alkenyl, alkynyl, aryl, heteroalkyl, heteroalkenyl, heteroalkynyl, heteroaryl, cycloalkyl, or heterocycloalkyl group to a position attached to the main chain of the alkyl or aryl, e.g., the replacement of a hydrogen by one of these molecules. Examples of substitution groups include, but are not limited to, hydroxy, halogen (e.g., F, Br, Cl, or I), and carboxyl groups. Conversely, as used herein, the term unsubstituted indicates the alkyl or aryl has a full complement of hydrogens, i.e., commensurate with its saturation level, with no substitutions, e.g., linear decane $(—(CH_2)_9—CH_3)$.

Methods of Making the Compounds

The compounds described herein can be prepared in a variety of ways and using various synthetic methods. At least some of these methods include the use of synthetic organic chemistry. The compounds described herein can be prepared from readily available starting materials. Variations on Formula I include the addition, subtraction, or movement of the various constituents as described for each compound. Similarly, when one or more chiral centers are present in a molecule, all possible chiral variants are included. Additionally, compound synthesis can involve the protection and deprotection of various chemical groups. The use of protection and deprotection and the selection of appropriate protecting groups can be determined.

Reactions to produce the compounds described herein can be carried out in solvents, which can be selected by organic synthesis. Solvents can be substantially nonreactive with the starting materials (reactants), the intermediates, or products under the conditions at which the reactions are carried out, e.g., temperature and pressure. Reactions can be carried out in one solvent or a mixture of more than one solvent. Product or intermediate formation can be monitored. For example, product formation can be monitored by spectroscopic means, such as nuclear magnetic resonance spectroscopy (e.g., $^1$H or $^{13}$C), infrared spectroscopy, spectrophotometry (e.g., UV-visible), or mass spectrometry, or by chromatography, such as high performance liquid chromatography (HPLC) or thin layer chromatography.

Exemplary methods for synthesizing the compounds as described herein are provided in Example 1 below.

Methods of Use

Provided herein are methods of producing hydrogen from formic acid and/or a formate. The methods of producing hydrogen involve dehydrogenating formic acid in the presence of a catalyst. The methods include contacting formic acid and/or a formate with a catalyst as described herein. The contacting step produces hydrogen and, one or more additional gases.

For example, the contacting step can also produce carbon dioxide ($CO_2$). The one or more additional gases are substantially free from carbon monoxide (CO). As used herein, the term substantially free means that the component is produced or is present in an amount of less than 0.1%, less than 0.01%, less than 0.001%, or less than 0.0001% based on the weight of the produced gases or present gases. The one or more additional gases are free from carbon monoxide (i.e., with 0% carbon monoxide produced or with undetectable levels of carbon dioxide present).

The formate can be a formate salt. For example, the formate salt can be sodium formate, potassium formate, lithium formate, or combinations thereof.

The step of contacting formic acid and/or a formate with a catalyst is performed in the presence of a solvent. The solvent includes an aqueous solvent, such as water. The solvent includes an alcohol, such as methanol. The solvent can be a combination of aqueous solvents and alcohols. The solvent is substantially free from any organic solvents (i.e., organic solvents are present in the contacting step in an amount of less than 0.1%, less than 0.01%, less than 0.001%, or less than 0.0001% based on the weight of the solvents). For example, the solvent for use in the contacting step is substantially free from dimethyl sulfoxide (DMSO), toluene, or other comparable organic solvents. In some examples, the solvent is free from organic solvents (i.e., 0% organic solvents or undetectable levels of solvent).

The contacting step is free from any base additives. For example, the contacting step is free from amines, such as trimethylamine, or other comparable amines. The contacting step can be performed under ambient conditions at room temperature.

The catalyst described herein is soluble in water and capable of catalyzing the selective production of hydrogen from formic acid under conditions that are free of organic solvents and amine bases. This eliminates potential risks that are associated with use of those organic solvents and amine bases. Additionally, the amine-free method described herein has a higher hydrogen density compared to the analogous formic acid/amine systems.

Under the conditions described herein for the catalysis of formic acid and/or formate, the release of hydrogen can be selectively controlled, producing only hydrogen and carbon dioxide. No carbon monoxide is produced and no solids or heavy reside will be generated. The described hydrogen generation from formic acid is a well-defined pathway with virtually 100% selectivity.

The catalyst has a turnover number (TON) from about 500 to about 2,000,000 (e.g., from about 1,000 to about 1,000,000, from about 2,500 to about 500,000, or from about 5,000 to about 350,000). The turnover number is the number of moles of substrate that a mole of catalyst can convert before becoming inactivated. The more stable the catalyst, the larger the TON will be.

The catalyst has a turnover frequency (TOF) of from about 5,000 h$^{-1}$ to about 100,000 h$^{-1}$ (e.g., from about 6,000 h$^{-1}$ to about 50,000 h$^{-1}$ or from about 8,000 h$^{-1}$ to about 12,000 h$^{-1}$). A catalyst's turnover frequency characterizes its level of activity per unit time. The TOF is the total number of moles transformed into the desired product by one mole of active site per hour. The larger the TOF, the more active the catalyst.

Also provided herein are methods of producing formic acid and/or a formate from carbon dioxide and hydrogen. The methods of producing formic acid and/or a formate include contacting carbon dioxide and hydrogen with a catalyst as described herein to produce formic acid and/or a formate. The contacting step is performed under increased pressure as compared to atmospheric pressure. The pressure is from about 15 psi to about 500 psi (e.g., from about 25 psi to about 450 psi, from about 50 psi to about 400 psi, from about 100 psi to about 300 psi, or from about 125 psi to about 250 psi).

Further described herein are methods for generating electricity. The methods for generating electricity include providing a source of hydrogen comprising formic acid and/or a formate, a catalyst as described herein, a reaction chamber, and a device that generates electricity (e.g., a fuel cell); delivering formic acid and/or a formate and the catalyst as described herein to the reaction chamber, under conditions in the formic acid reaction chamber that cause the formic acid and/or the formate to convert to hydrogen and carbon dioxide; and delivering the converted hydrogen to the device (e.g., the fuel cell). Delivery of the hydrogen to the fuel cell, for example, provides the input that the fuel cell needs to generate electricity.

The fuel cell cooperates with a power converter to convert electricity generated by operations of the fuel cell to an appropriate current for delivery to a battery. The converted power can be delivered to a battery, which can be any appropriate battery necessary for powering the electric device to be powered. For example, the battery can be used for powering an electric automobile, a portable device, or a hydrogen filling station. Thus provided herein are electric automobile, a portable device, a hydrogen filling station, or other equipment powered by using a source of formic acid and/or a formate and the catalyst as described herein, a reaction chamber and an electric device (e.g., a battery or fuel cell) powered by the conversion of formic acid and/or the formate to hydrogen and carbon dioxide.

EXAMPLES

The examples below are intended to further illustrate certain aspects of the methods and compositions described herein, and are not intended to limit the scope of the claims.

General Experimental Procedures

All experiments with metal complexes were carried out under an atmosphere of dry argon in a glovebox or using standard Schlenk techniques, unless otherwise indicated. All other chemicals were commercially available and used as received. ¹H and ¹³C NMR spectra were recorded on a Bruker 400 MHz or 600 MHz spectrometer at 400 MHz and 100 MHz or 600 MHz and 125 MHz, for hydrogen and carbon, respectively. Column chromatography was performed on silica gel (200-300 mesh).

Gas chromatography analysis results were obtained using a Techcomp GC7890 II equipped with a thermal conductivity detector (TCD) and a flame ionization detector (FID). The pH values were measured on a ZDJ-400DH multi-function titrator with a glass electrode after calibration using standard buffer solutions. High resolution mass spectrometry (HRMS) data were recorded on a Finnigan MAT 95 system. Elemental analyses were carried out on a Flash 2000 elemental analyzer. The X-ray diffraction data were collected using a Bruker-AXS KAPPA-APEXII CCD diffractometer. The N,N'-diimine ligand was synthesized in the laboratory. Turnover number (TON) and turnover frequencies (TOF) were calculated.

Example 1: Synthesis of Compounds

Synthesis and Characterization of Complex 1[Ru(p-Cymene)(THBID)Cl]Cl

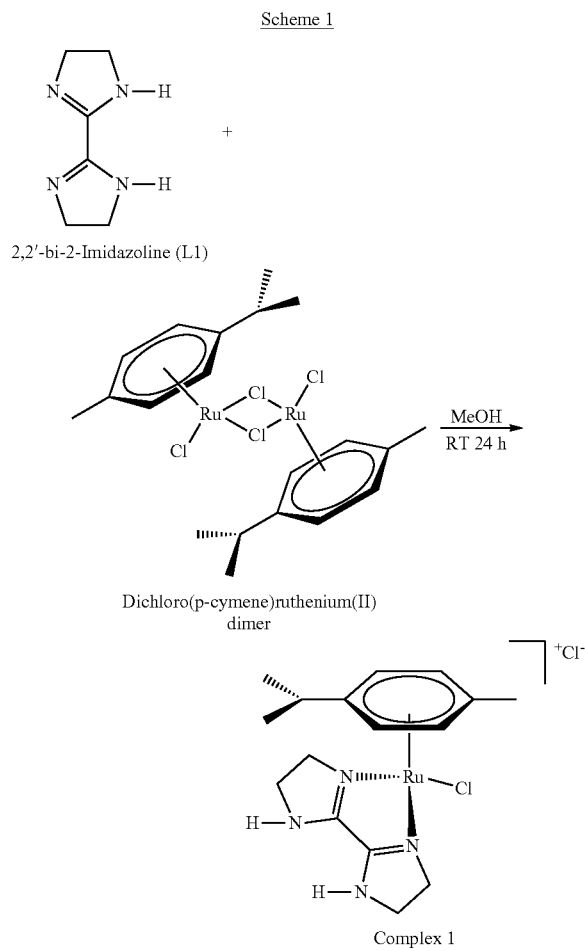

In a glove box, dry methanol (30.0 mL) was added to a mixture of dichloro(p-cymene)ruthenium(II) dimer (0.20 mmol) and 2,2'-bi-2-imidazoline (0.40 mmol) in a reaction flask and stirred overnight at room temperature. Methanol was then removed under reduced pressure. Column chromatography was used to purify the complex using $CH_2Cl_2$/MeOH (50:1-20:1) as the eluent. Yield: 60 weight %. A single crystal of Complex 1 was obtained from a mixture of DMSO and ether (1:20). ¹H NMR (600 MHz, DMSO) δ 8.61 (s, 1H), 5.88 (d, J=6.1 Hz, 2H), 5.60 (d, J=6.0 Hz, 2H), 4.61-4.30 (m, 2H), 3.90-3.77 (m, 4H), 3.72 (dd, J=24.6, 12.6 Hz, 2H), 2.71 (dt, J=13.8, 6.9 Hz, 1H), 2.11 (s, 3H), 1.16 (d, J=6.9 Hz, 6H). $^{13}C\{^1H\}$NMR (125 MHz, DMSO): δ (ppm)=159.09, 102.37, 99.52, 83.08, 80.98, 55.39, 46.45, 31.15, 22.49, 18.97; m/z (ESI+) 409.1 [M-Cl]+; elemental analysis for $C_{16}H_{24}C_2RuN_4$ calculated: C 43.24, H 5.44, N 12.61; found: C 42.79, H 5.63, N 12.73.

FIG. 1 is a structural schematic from X-ray diffraction crystallography performed on the crystal of Complex 1 obtained from Scheme 1 synthesis. In Complex 1, a p-cymene($\eta^6$) is coordinated to the Ru center with a chloride and 2,2'-bi-2-imidazoline ligands to give a saturated 18-electron cationic complex. Complex 1 is intrinsically stable in air and is water-soluble (~30 mg/mL).

Example 2: Formic Acid Decomposition

General Procedure for Catalytic Dehydrogenation of $HCO_2H$:

Formic acid ($HCO_2H$) decomposition experiments were carried out in a two-necked septum-inlet round-bottom flask equipped with a reflux condenser and a magnetic stirrer at the appropriate temperature. The catalyst stock solution was freshly prepared before use. The aqueous catalyst stock solution was injected through a septum-inlet into a flask containing 5.0 mL of a formic acid ($HCO_2H$) and/or sodium formate (HCOONa) aqueous solution. The gas produced was monitored by an ADM 2000 Flowmeter and the data were collected every 2 seconds. The amount of $H_2$ was confirmed via the water displacement method.

Gas Composition Analysis:

The identity of the gas products of the formic acid decomposition experiments were determined using an on-line pre-calibrated gas chromatograph (Agilent 7890B) ($H_2$, CO, $CH_4$, $CO_2$). The gas chromatograph was equipped with the following two channels: 1) two HayeSep Q columns and 13× molecular sieves with a thermal conductivity detector using helium (He) as a carrier gas for $CO_2$ and CO analysis, and 2) a HayeSep Q and 13× molecular sieves with a thermal conductivity detector using argon (Ar) as a carrier gas for $H_2$ analysis. After an initial reaction time of 1 minute, the gas produced was analyzed by purging the produced gas directly to the on-line gas chromatograph in 15 minute increments.

Procedure for Dehydrogenation of Formic Acid by Intermittent Addition of Formic Acid:

A stir bar, water (5.0 mL), and a formic acid/sodium formate (FA/SF) aqueous solution (5M, 4:1) were placed in a two-necked reaction flask. After the solution was preheated at 90° C., a water solution of Complex 1 (0.5 mL, 0.5 µmol) was injected into the flask. Formic acid was added at a constant rate via a syringe pump, based on the rate of consumption (0.1-0.3 mL/hr).

Results:

The decomposition of formic acid (FA) was examined with various FA/HCOONa ratios in an aqueous solution at a temperature of 90° C. (see Table 1). For each decomposition reaction, 2 µmol of Complex 1 were used as the catalyst. No reaction occurred in the absence of the catalyst.

Each condition was repeated at least twice with an error less than 5%. The volume of $H_2$ evolved was measured in the first 10 minutes.

The maximum turnover frequency (TOF) was estimated based on the $H_2$ produced. For entry 1, 5.0 mL of a 5.0 M formic acid solution were used. For entry 2, 5.0 mL of a 5.0 M sodium formate/formic acid (1:1) solution were used. For entry 3, 5.0 mL of a 5.0 M sodium formate/formic acid (2:1) solution were used. For entry 4, 5.0 mL of a 2 M sodium formate/formic acid (5:1) solution were used. For entry 5, 5.0 mL of a 1 M sodium formate/formic acid (10:1) solution were used.

Figure 2A:
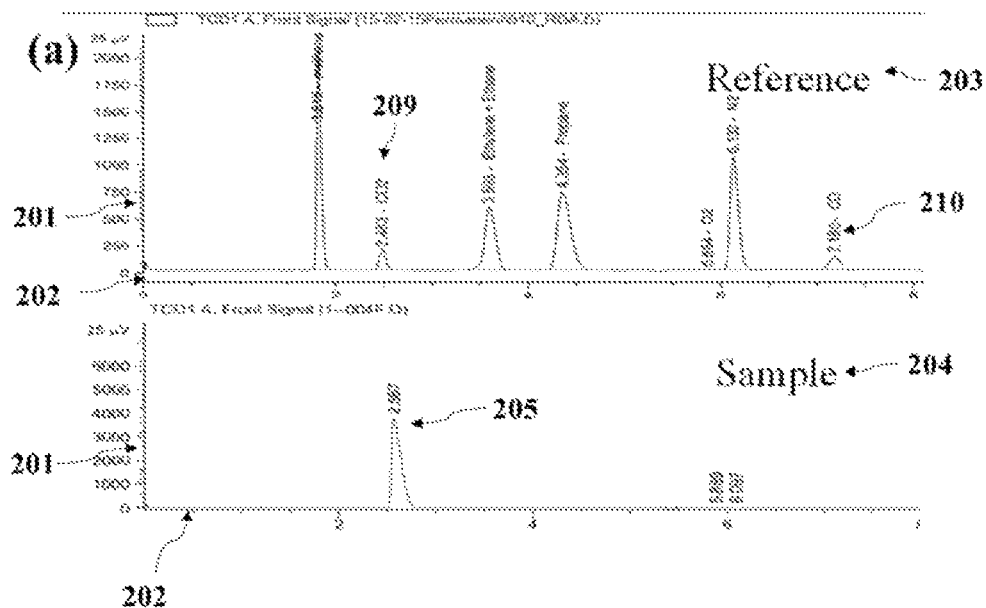
FIG. 2A is a plot showing the compositional analysis of the evolved gas mixture by a formic acid dehydrogenation reaction catalyzed by Complex 1. The upper plot is the reference plot for the $CO_2$/CO gas standard and the lower plot is the sample plot showing the detection of $CO_2$.
Figure 2B:
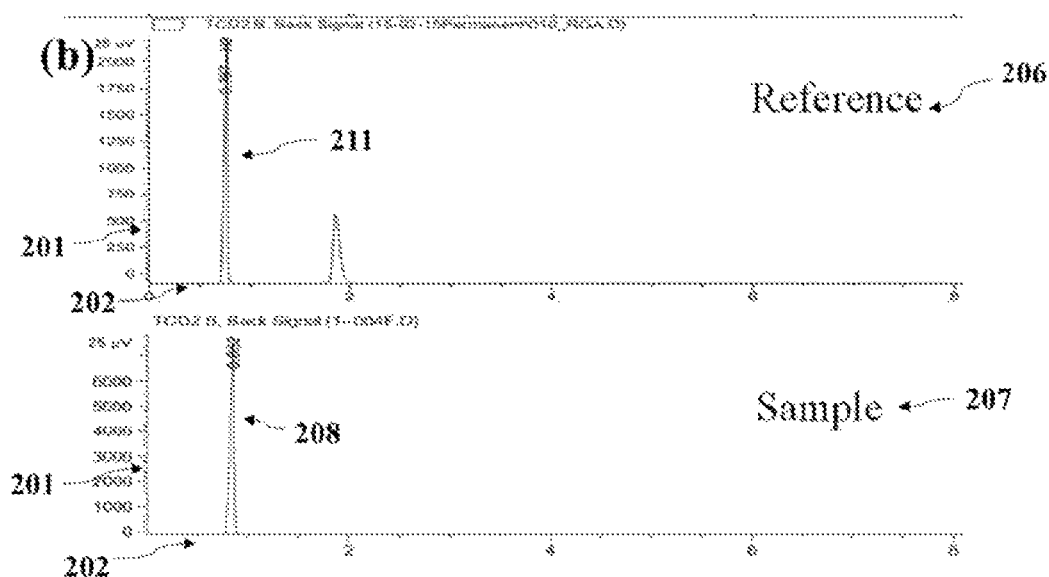
FIG. 2B is a plot showing the compositional analysis of the evolved gas mixture by a formic acid dehydrogenation reaction catalyzed by Complex 1. The upper plot is the reference plot for the $H_2$ gas standard and the lower plot is the sample plot showing the detection of $H_2$.

Using a formic acid only solution, an initial turnover frequency (TOF) of 3750 h$^{-1}$ was obtained (see Table 1, entry 1). FIGS. 2A and 2B show results of gas chromatography for gas samples collected for Table 1, entry 1 with signal intensity (201) shown on the y-axis and retention time (202) shown on the x-axis. After an initial reaction time of 1 minute, the gas produced was analyzed by purging the produced gas directly to the on-line gas chromatograph in 15 minute increments.

FIG. 2A shows the reference graph (203) of retention times (202) observed for the standard gas for $CO_2$/CO analysis using helium carrier gas, and the sample graph (204) for retention time observed for the sample gas of Table 1, entry 1. Peaks at 2.483 for $CO_2$ (209) and 7.180 for CO (210) were observed for the gas standard on the reference graph (203). A peak at 2.567 (205) was observed for the sample gas indicating the presence of $CO_2$ with no peak observed for CO from the sample gas.

FIG. 2B shows the reference graph (206) of peaks observed for the standard gas for $H_2$ analysis using Argon carrier gas, and the sample graph (207) for peaks observed for the sample gas of Table 1, entry 1. A peak at 0.767 was observed for $H_2$ (211) on the reference graph (206). On the sample graph (207), a peak at 0.852 (208) was observed indicating the presence of $H_2$. The molar ratio of $H_2$ and $CO_2$ was measured to be approximately 1:1 based on the calibration curve using standard gas with no CO detected in the sample.

When one equivalent of HCOONa (SF) was mixed in the FA solution, the rate of decomposition of FA was accelerated to give a TOF of 8125 h$^{-1}$, which is nearly double the rate without using SF (see Table 1, entry 2). These results show that the extra formate (HCOO$^-$) is beneficial for the decomposition of FA in water. A maximum TOF of 12,000 h$^{-1}$ was achieved when the ratio of SF and FA was increased to 5 (see Table 1, entry 4). In all cases, the composition of the evolved gas was confirmed by gas chromatography to be an equimolar mixture of $H_2$ and $CO_2$ with no trace amount of CO detected.

These observations indicate that the decomposition of FA catalyzed by Complex 1 is highly selective and produces only $H_2$ and $CO_2$, suitable for fuel cell applications without the CO poisoning of electrodes.

TABLE 1

| Entry | Ratio of SF/FA | TOF$_{max}$ (h$^{-1}$) | $H_2$ (mL) |
|---|---|---|---|
| 1 | 0 | 3750 | 30 |
| 2 | 1 | 8125 | 65 |
| 3 | 2 | 9375 | 75 |
| 4 | 5 | 12,000 | 96 |
| 5 | 10 | 8250 | 66 |

Example 3: Mechanism Studies

The activation energy ($E_a$) was studied by measuring the initial reaction rates for the decomposition of formic acid catalyzed by 2 µmol of Complex 1. Reaction rates were measured at temperatures ranging from 60° C. to 90° C. in 5 mL of a 5M solution of formic acid and sodium formate (1:1).

Figures 3A, 3B:
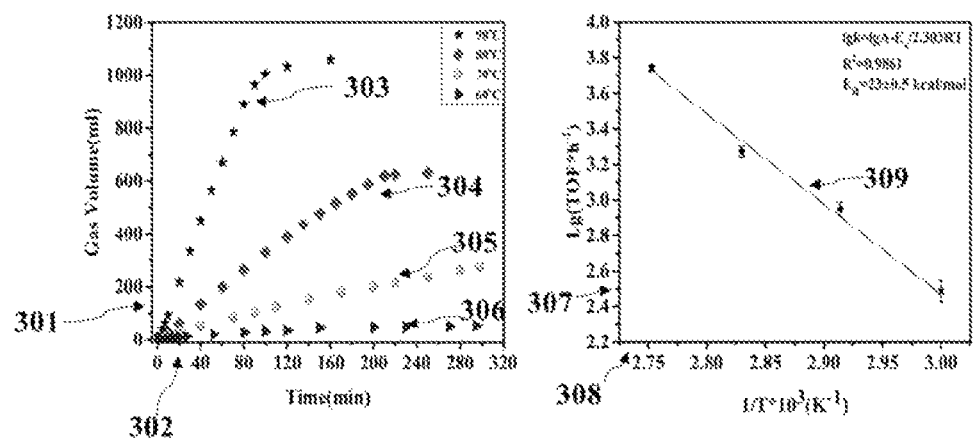
FIG. 3A is a plot of gas volume against time for the decomposition of formic acid to produce hydrogen and carbon dioxide in the presence of Complex 1 at different temperatures.
FIG. 3B is an Arrhenius plot of the initial TOF (Turnover Frequency) for the decomposition of formic acid using Complex 1.

In FIG. 3A, the gas volume (301) and time in minutes (302) were plotted for the reactions conducted at 60° C. (306), 70° C. (305), 80° C. (304), and 90° C. (303). As seen in FIG. 3A, increasing temperatures led to a larger gas volume produced in less time, indicating that the initial reaction rates increase as the reaction temperature increases.

FIG. 3B is an Arrhenius plot of the initial TOF values for the decomposition seen in FIG. 3A under the same reaction conditions demonstrating temperature dependencies for reaction rates. On this graph, the log of the TOF is plotted against 1/T to determine the trend of activation energy. The TOF was determined in the first 10 minutes. As shown in FIG. 3B, the estimated apparent activation energy ($E_a$) by the Arrhenius plot is 23 KJ/mol, which is within the known range of FA dehydrogenation reactions catalyzed by noble metals.

To identify the rate-determining step (RDS) in the catalytic process, a kinetic isotope effect (KIE) study was conducted. The kinetic isotope effect (KIE) is the change in the rate of a chemical reaction when one of the atoms in the reactant being studied is substituted for one of its isotopes. For the present KIE study, one or more of the hydrogens ("common" hydrogen, designated H) in the substrate and/or the solvent were substituted with deuterium ("heavy" hydrogen, designated D). For each of the reactions used in the study, the reagents included 2 µmol of Catalyst 1 and 5 mL of a 2.5 M formic acid solution. The reaction was performed at a temperature of 90° C. The Turnover Frequency (TOF) was calculated in the first 10 minutes. The KIE was calculated using the following equation: KIE=TOF(entry 1)/TOF (entry n)(n=2,3,4). The results are shown in Table 2.

TABLE 2

| Entry | Substrate | Solvent | TOF [h$^{-1}$] | KIE |
|---|---|---|---|---|
| 1 | HCOOH | $H_2O$ | 2550 | — |
| 2 | DCOOH | $H_2O$ | 1200 | 2.1 ± 0.3 |
| 3 | HCOOD | $D_2O$ | 1800 | 1.4 ± 0.2 |
| 4 | DCOOD | $D_2O$ | 800 | 3.1 ± 0.4 |

Table 2, entry 1, with no deuterium (D) substitutions in either the substrate or the solvent, serves as the baseline for comparison. Using DCOOH instead of HCOOH, the reaction rate was reduced to a KIE of 2.1±0.3 (see Table 2, entry 2), but the KIE is only 1.4±0.2 when HCOOD was used (see Table 2, entry 3). A slightly greater KIE of 3.1±0.4 was observed with DCOOD in D20 (see Table 2, entry 4). These results suggest that the hydride transfer from the formate to Ru is the Rate Determining Step (RDS) in the catalytic cycle.

Figure 4:
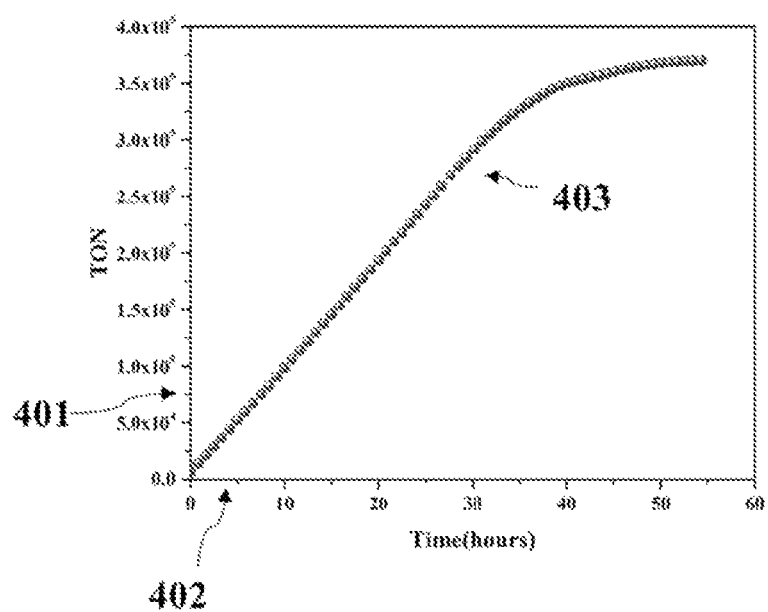
FIG. 4 is a plot of the time-dependent performance of Complex 1 in the decomposition of formic acid reaction, as shown by TON (Turnover Number) against time.

In FIG. 4, the TON (401) and time in hours (402) were plotted (403) for the reaction when formic acid (HCOOH) was added at a constant rate (equal to the rate of formic acid consumption). Under these controlled reaction rate conditions, a TON of 350,000 was achieved in approximately 35 hours.

Computational Calculations:

All calculations were performed using the Gaussian 09 program package. The geometric structures of all species were first optimized without any geometry or symmetry constraint, using M06 functional with BSI basis set (BSI denotes the basis set combination of SDD for transition metals and the all-electron 6-31G (d, p) for N, O, H, and C). The M06 is a dispersion-corrected functional and can well estimate the reaction energy because of the consideration of weak interaction.

The solvation effects of water solvent were considered by SMD (solvation model density), which is a universal solvation model based on the polarized continuous quantum mechanical charge density of the solute. Each stationary point was classified as a minimum or transition state by analytical calculation of the frequencies. The IRC (intrinsic reaction coordinate) calculations at the same level were carried out to confirm the right connections among a transition state and its forward and backward minima. The energy of each species was refined by a single-point calculation at the M06/BSII level coupled with SMD solvent model (BSII denotes the basis set combination of SDD for Ru and the all-electron 6-311++G (2d, p) for N, O, H, C).

Calculations were carried out to assess a proposed mechanism for the formic acid dehydrogenation by Complex 1 and to determine transition states and energy barriers for the reactions that were observed experimentally. The proposed mechanism is shown in Scheme 2.

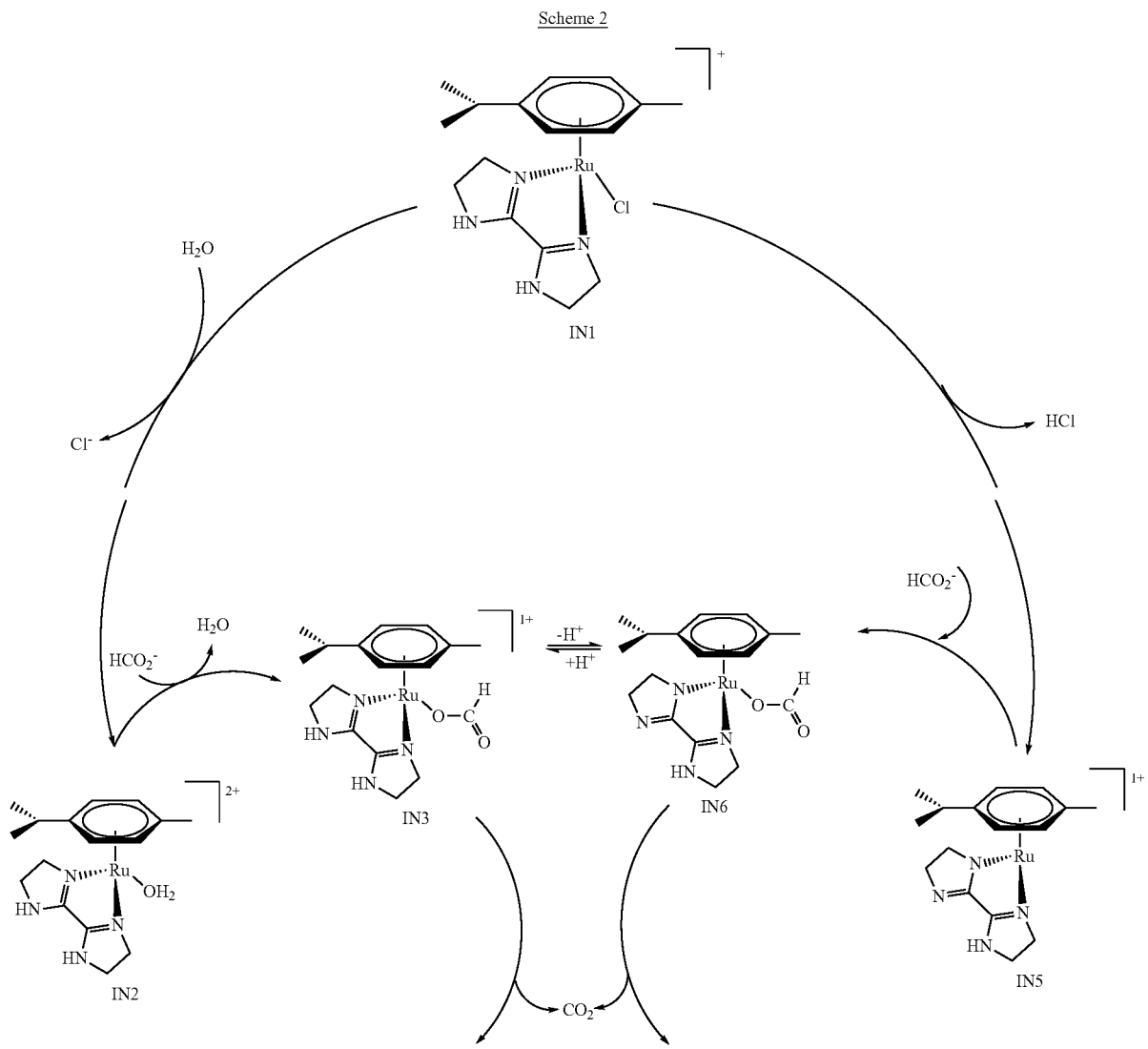

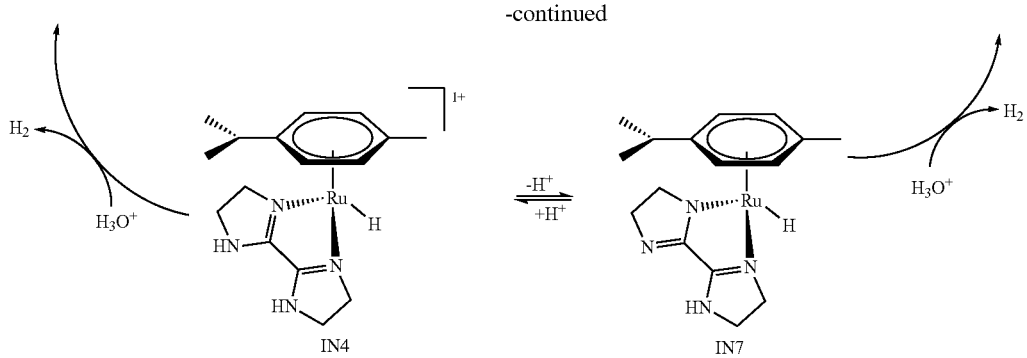

Figure 5:
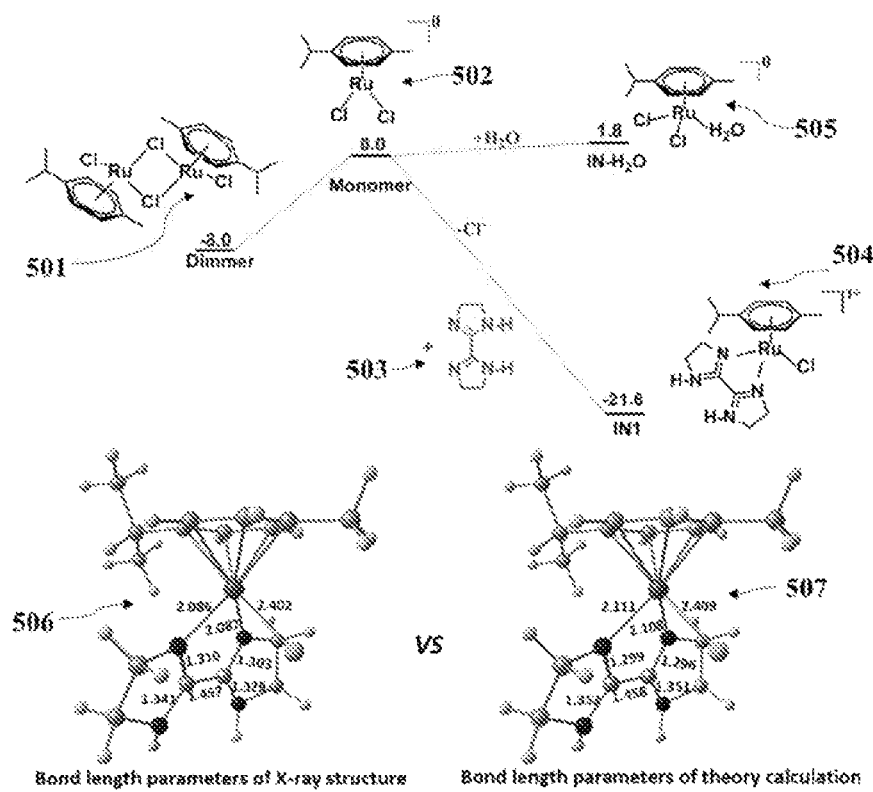
FIG. 5A contains free energy profiles for the activation of the ruthenium dimer to the chloride complex.
FIG. 5B shows bond length parameters of the X-Ray structure of the IN1 chloride complex vs the optimized structure.

In FIG. 5A, the calculated free energy profile shows the chloride complex IN1 (504) is easily formed from dimer complex [RuCl$_2$(p-cymene)]$_2$ (501). The monomer (502) interaction with 2,2'-bi-2-imidazoline (503) yielding the chloride complex IN1 (504) has an activation energy of −21.6, while the IN—H$_2$O (505) byproduct has a higher energy barrier of 1.8.

In FIG. 5B, the optimized geometry and the X-ray diffraction determined geometry of the IN1 chloride complex are compared. The optimized structure (507) of chloride complex IN1 is in agreement with the X-ray diffraction determined structure (506) of chloride complex IN1 as seen in the bond length parameter comparison in FIG. 5B.

The detailed free energy profiles (600) for the proposed mechanism in Scheme 2 are shown in FIG. 6. The corresponding structures and bond parameters of the intermediate and transitional states in FIG. 6 are presented in FIG. 7, and active barriers for S-transitional states are shown in FIG. 8. Experimentally, the best TOF was obtained at pH 4.3.

Figure 6A:
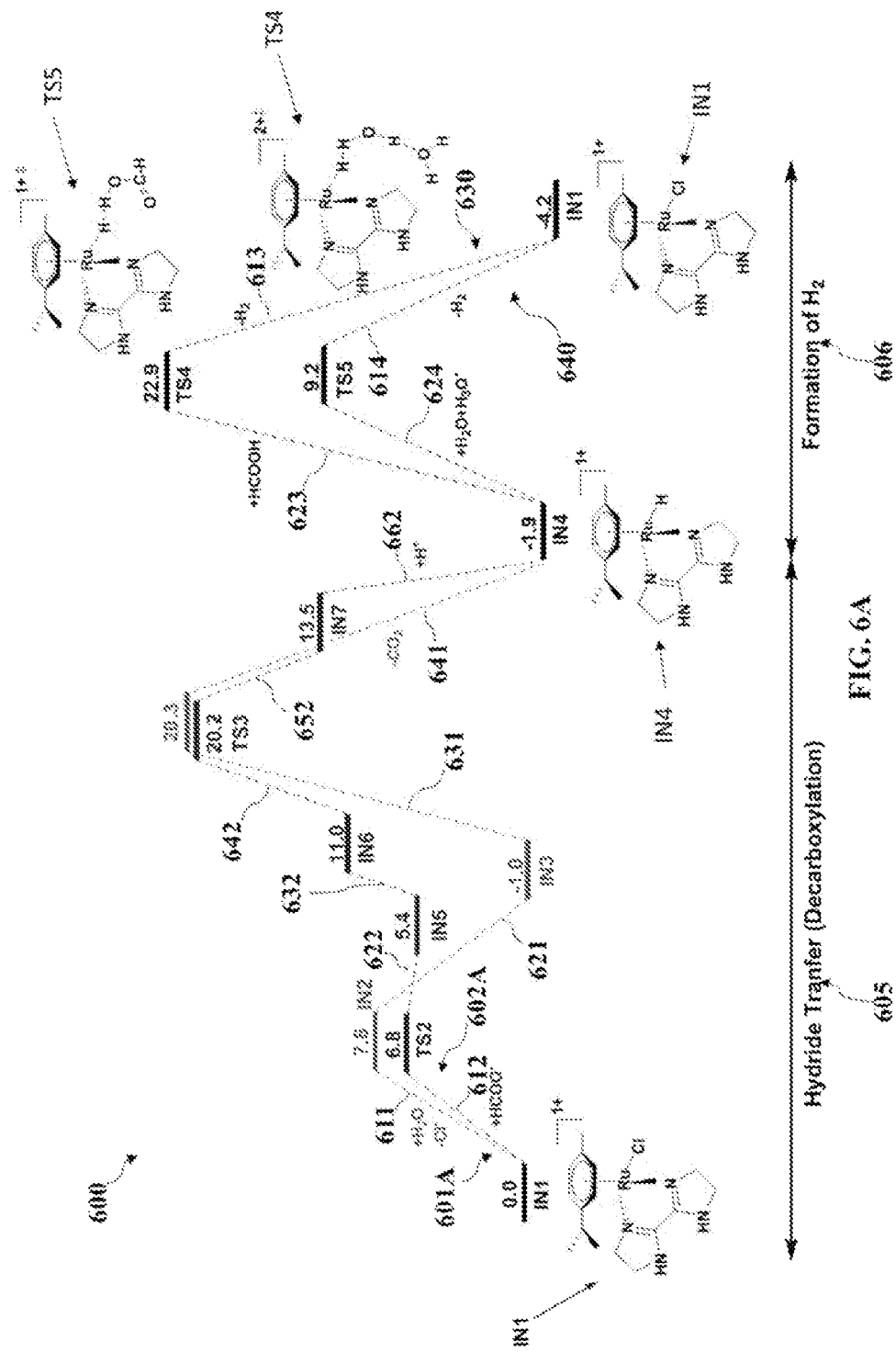
FIG. 6A contains relative free energy profiles for the structures according to the proposed mechanism in Scheme 2.

As shown in FIG. 6A, there are two possible pathways for the hydride transfer (605) from chloride complex IN1 to hydride complex IN4, including Pathway #1 (601) (involving IN2 to IN3 to TS1) and Pathway #2 (602) (involving TS2 to IN5 to IN6 to TS3 to IN7).

As seen in Pathway #1 (601A) of FIG. 6A, the replacement of the chloride ligand in IN by water (via 611) gives intermediate IN2, which is endothermic by 7.8 kcal/mol. The coordination of the formate anion to the Ru center is easier with a bond length of 2.101 Å (701) to give the more stable formate intermediate IN3 (via 621), which is −1.0 kcal/mol relative to intermediate IN1. The outer-sphere hydride transfer transition state TS1 (via 631) was then located, where Ru—H bond and C—H bond are 2.246 Å (702) and 1.172 Å (703), respectively.

The active barrier from IN3 to TS1 is 20.3 kcal/mol. The inner-sphere β-H elimination transition state S-TS1 (FIG. 8) was then located, involving the breakage of Ru—N coordination bond, but the corresponding active barrier is higher than that of TS1 (25.5 kcal/mol vs 20.3 kcal/mol). FIG. 8 shows the theorized S-TS1 bond length geometric structure. The release of CO$_2$ (via 641) gives the stable hydride intermediate IN4, which is −1.9 kcal/mol relative to IN1.

As seen in Pathway #2 (602A) of FIG. 6A, intermediate IN1 to transition state TS2 represents the proton abstraction of the NH moiety by a formate anion (via 612) with a low active barrier of 6.8 kcal/mol. The following IN5 intermediate loses the chloride ligand and the proton of the NH group (via 622), which can be observed by experimentation.

The addition of formate (via 632) leads to IN6. The formate intermediate IN6 to transitional TS3 is losing one proton (via 642) and has the shorter Ru—O and Ru—N coordination bonds and the higher free energy than IN3. The theorized bond length geometric structure for IN6 can be seen in FIG. 7. However, the outer-sphere hydride transfer transition state TS3 that is losing one proton has free energy analogous to TS1 (20.2 vs 20.3 kcal/mol).

From structural parameters, TS3 is an early transition state, in which the Ru—H bond is 2.523 Å bond (704) and C—H bond is 1.155 Å (705). After releasing the CO$_2$ (via 652), intermediate IN7 can be protonated (via 662) to give hydride intermediate IN4. For the entire Pathway #2 (602A), the active barrier is 20.2 kcal/mol from IN1 to TS3, which is only slightly lower than the active barrier of 20.3 kcal/mol for Pathway #1 (601A).

Figure 6B:
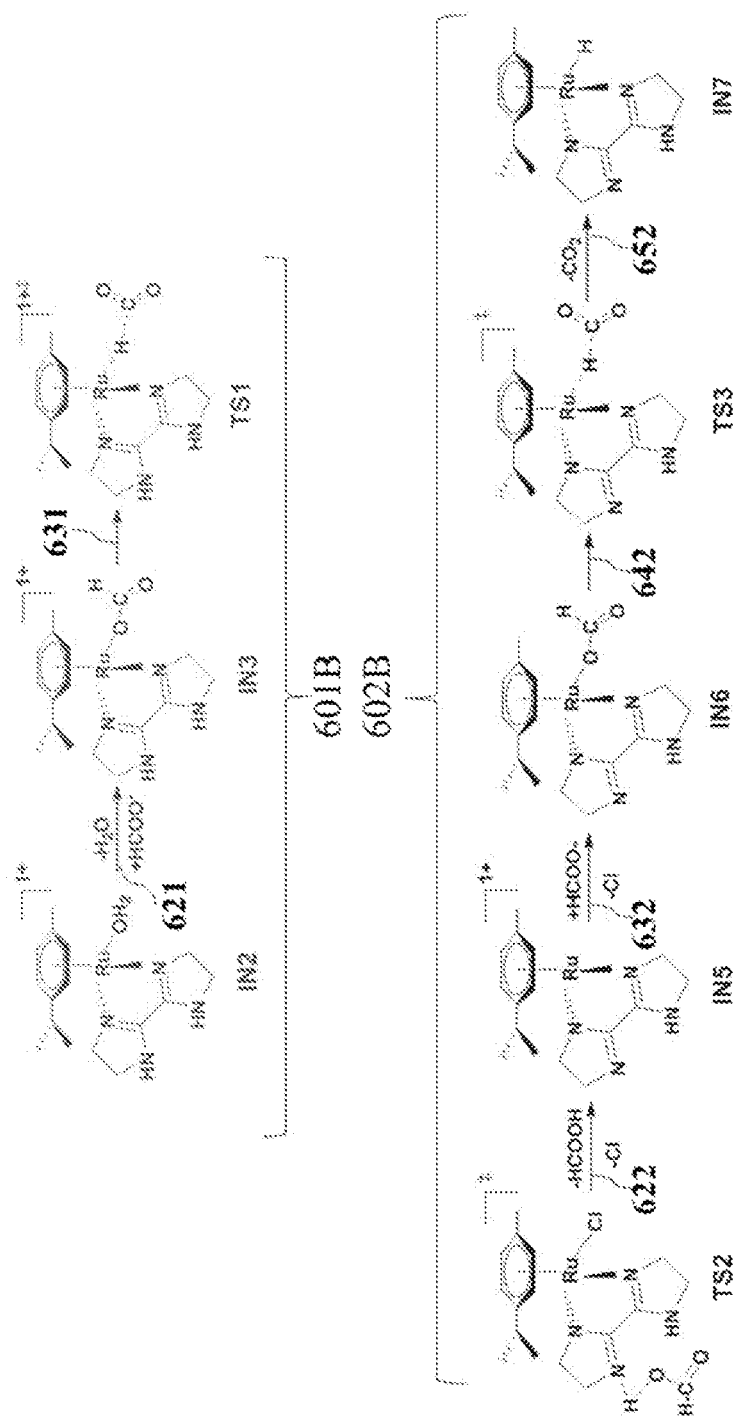
FIG. 6B shows structures of the intermediate and transitional compounds of Scheme 2.

FIG. 6B shows the structures of the intermediates (IN) and transitional states (TS) in Scheme 2 for Pathway #1 (601B) and Pathway #2 (602B). Both pathways start with IN1 and end with IN4, via the same paths as indicated in FIG. 6A. Pathway #1 (601A) encompasses the intermediate and transitional states IN1-IN2-IN3-TS1-IN4 (via 611-621-631-641). Structures for IN2, IN3 and TS1 are shown in FIG. 6B (601B).

Pathway #2 (602A) encompasses the intermediate and transitional states IN1-TS2-IN5-IN6-TS3-TS7-IN4 (via 612-622-632-642-652-662). Structures for TS2, IN5, IN6, TS3, and IN7 are shown in FIG. 6B (602B). Based on the comparable active barriers and experimental observations illustrated in FIG. 6A, but not to be bound by theory, both Pathways #1 and #2 can competitively occur for hydride transfer stage in the actual reaction.

As shown in FIG. 6A for the formation of H$_2$ (606) for the hydride intermediate IN4 transition to IN1, two proton sources were chosen, including formic acid and hydrated proton with one water. The transition state TS5 with formic acid (via 613-623) as the proton source has 13.7 kcal/mol higher active barrier than transition state TS4 with a hydrated proton (via 614-624).

Figure 7:
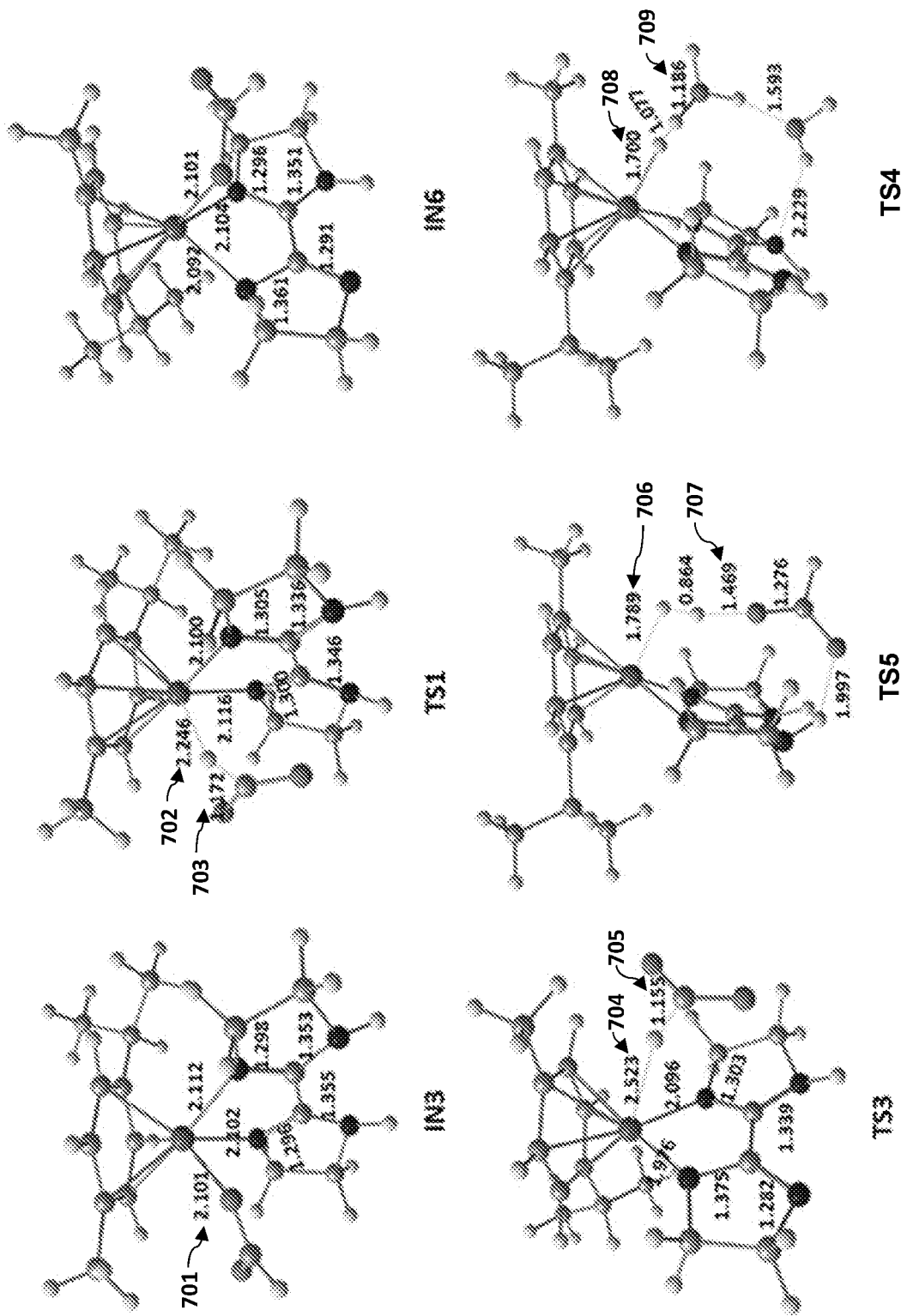
FIG. 7 contains structures of the optimized geometries of the hydride transfer transition states and intermediates, and the optimized geometries of the formation of $H_2$ transition states.
Figure 8:
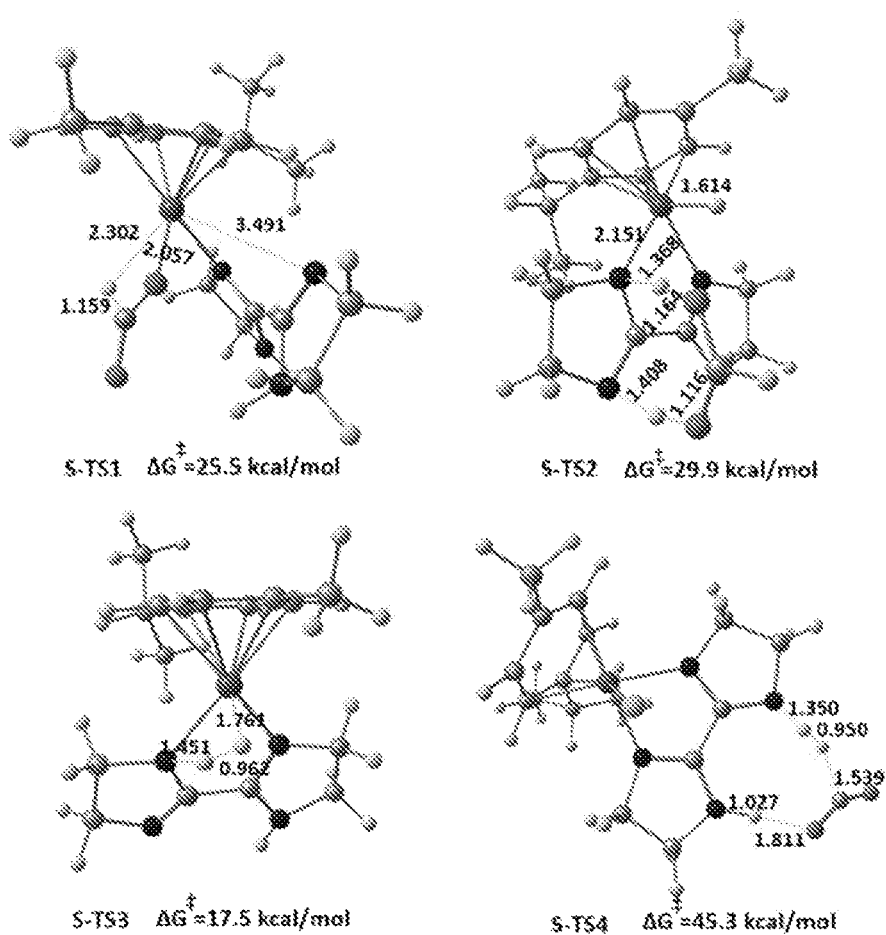
FIG. 8 contains optimized structures and active barriers of the transition states.

As seen from structural parameters in FIG. 7, TS5 has the more strained structure compared to TS4, especially the longer stretching of the Ru—H bond (1.789 Å) (706) and O—H bond (1.469 Å) (707) in TS5 as compared to that of TS4 (Ru—H, 1.700 Å (708); O—H, 1.186 (709)). Thus, the hydrated proton connected by one water in TS4 is a better proton source which can be due to favorable steric effects.

For another H$_2$ formation pathway with transition states S-TS2 and S-TS3 (seen in FIG. 8), the higher active barriers, 29.9 kcal/mol and 17.5 kcal/mol, respectively, exclude the possibility that this reaction pathway will occur.

The mechanism not involving the metal center (S-TS4 in FIG. 8) was also studied, showing that the hydride of the formate anion directly reacts with the proton of the NH group to give H$_2$ and CO$_2$, but the active barrier of 45.3 kcal/mol is very high. Overall, the outer-sphere hydride transfer stage is the rate-determining step and occurs via comparable pathways, Pathway #1 (601A) or Pathway #2 (602A), which is supported by the experimental results presented here. The formation of $H_2$ (606) occurs via TS4 with a hydrated proton connected by one water as the proton source (via 604).

In summary, it was identified that the N, N-diimine ligand shows good activity when complexed with Ru to give high TOF and TON of 12,000 h- and 350,000, respectively. Experimental and DFT studies were conducted to elucidate a plausible mechanism of the FA/SF decomposition. The deprotonation of one NH group of a N,N-diimine ligand at pH of 4.3 can result in two competitive pathways for the key hydride transfer step.

Example 4: L3 Ligand

The L3 ligand was further explored by modifying the ligand to enhance the activity. The $R^2$ group was substituted with a series of electron donating substituents and electron withdrawing substituents, and the activation energy associated with each substitution was observed.

Figure 9A:
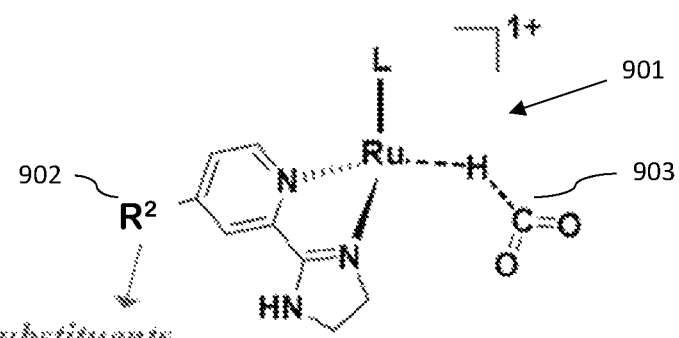
FIG. 9A is a structure for para-position substitution with the L3 ligand.

FIG. 9A shows Structure I-B (901) with $R^2$ (902) in the para-position of the pyridine ring and a formate ion (903) in the $X^1$ position. For the Ru-L3 complex in FIG. 9A, Structure II-B has a ruthenium metal center and the L3 ligand. The L3 ligand has a Gibbs energy of $\Delta G\ddagger$ (kcal/mol)=23.7.

Figure 9B:
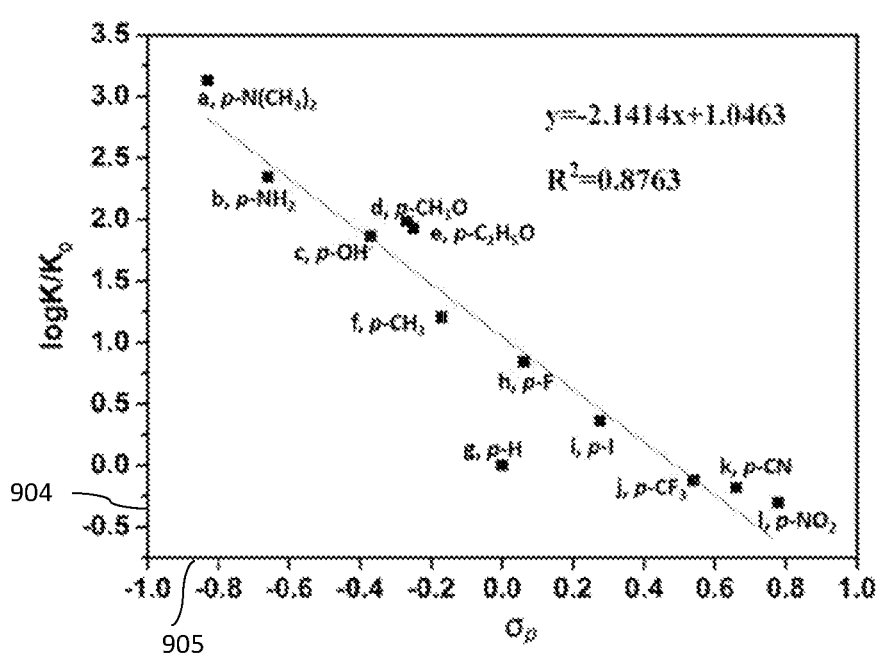
FIG. 9B is a graph of sigma constants of para-substitutions plotted against the equilibrium constant.

A series of electron-withdrawing and electron-donating substituents were introduced in the $R^2$ (902) para-position (p-) of the pyridine ring. The graph seen in FIG. 9B shows the sigma constants (904) of the substituents plotted against the log of the equilibrium constant (905) for the reaction. Electron-donating substituents are a-f and electron-withdrawing substituents are g-k.

Table 3 shows electron-donating groups a-f, and electron-withdrawing groups g-k, that were substituted at the $R^2$ para-position of the pyridine ring and the Gibbs energy associated with group in brackets.

TABLE 3

| R: Electron-donating substitutes: [$\Delta G\ddagger$ (kcal/mol)] | | | | | |
|---|---|---|---|---|---|
| a. $N(CH_3)_2$ | b. $NH_2$ | c. OH | d. $CH_3O$ | e. $C_2H_5O$ | f. $CH_3$ |
| [18.4] | [19.2] | [20.5] | [20.3] | [20.4] | [21.6] |
| R: Electron-withdrawing substitutes: [$\Delta G\ddagger$ (kcal/mol)] | | | | | |
| g. F | h. I | i. $CF_3$ | j. CN | k. $NO_2$ | |
| [22.2] | [23.0] | [23.5] | [23.6] | [24.1] | |

When the $R^2$ group is an electron-donating group, it was observed that the activation energy ($\Delta G^*$) can be significantly lowered, suggesting the corresponding complex is more active in catalyzing the hydrogen production from formic acid. Substituents a, d, e, and f are synthetically accessible.

The compounds and methods of the appended claims are not limited in scope by the specific compounds and methods described herein, which are intended as illustrations of a few aspects of the claims and any compounds and methods that are functionally equivalent are within the scope of this disclosure. Various modifications of the compounds and methods in addition to those shown and described herein are intended to fall within the scope of the appended claims. Further, while only certain representative compounds, methods, and aspects of these compounds and methods are specifically described, other compounds and methods are intended to fall within the scope of the appended claims. Thus, a combination of steps, elements, components, or constituents can be explicitly mentioned herein; however, all other combinations of steps, elements, components, and constituents are included, even though not explicitly stated.

What is claimed is:

1. A compound of the formula:

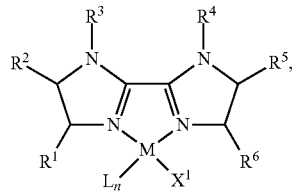

or a salt thereof, wherein:
L is a neutral ligand or an anionic ligand, wherein L is a substituted aryl;
M is a metal or a metal ion;
n is 0, 1, or 2;
$R^1$, $R^2$, $R^3$, $R^4$, $R^5$, and $R^6$ are each independently selected from hydrogen, substituted or unsubstituted alkyl, and substituted or unsubstituted aryl; and
$X^1$ is a halide, a hydride, or a formate ion.

2. The compound of claim 1, wherein the compound has the following formula:

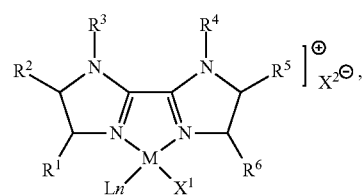

wherein $X^2$ is a halide.

3. The compound of claim 2, wherein the metal or the metal ion comprises ruthenium (Ru), iron (Fe), osmium (Os), iridium (Tr), or palladium (Pd).

4. The compound of claim 2, wherein $R^1$, $R^2$, $R^3$, $R^4$, $R^5$, and $R^6$ are each hydrogen.

5. The compound of claim 2, wherein L is p-cymene.

6. The compound of claim 2, wherein the compound has the following structure:

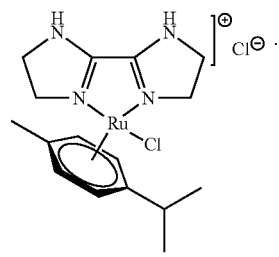

7. A compound of the formula:

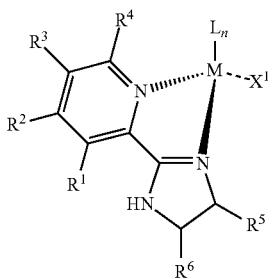

or a salt thereof, wherein:
  L is a neutral ligand or an anionic ligand;
  M is a metal or a metal ion;
  n is 0, 1, or 2;
  $R^1$, $R^3$, $R^4$, $R^5$, and $R^6$ are each independently selected from hydrogen, substituted or unsubstituted alkyl, and substituted or unsubstituted aryl;
  $R^2$ is hydrogen, substituted or unsubstituted alkyl, substituted or unsubstituted aryl, $N(CH_3)_2$, $NH_2$, OH, $CH_3O$, $C_2HO$, $CH_3$, F, I, $CF_3$, CN, or $NO_2$, and
  $X^1$ is a halide, a hydride, or a formate ion.

8. The compound of claim 7, wherein the compound has the following formula:

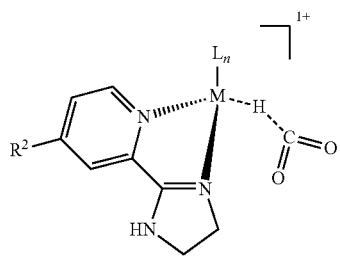

wherein:
  L is a neutral ligand or an anionic ligand, and
  $R^2$ is hydrogen, substituted or unsubstituted alkyl, substituted or unsubstituted aryl, $N(CH_3)_2$, $NH_2$, OH, $CH_3O$, $C_2H_5O$, $CH_3$, F, I, $CF_3$, CN, or $NO_2$.

9. A method of producing hydrogen from formic acid and/or a formate, comprising:
  providing a catalyst compound selected from one of the following structures:

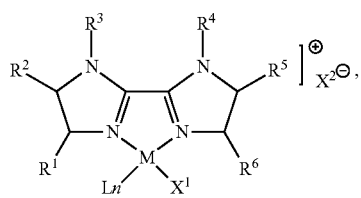

or a salt thereof, wherein:
  L is a neutral ligand or an anionic ligand, wherein L is a substituted aryl;
  M is a metal or a metal ion;
  n is 0, 1, or 2;
  $R^1$, $R^2$, $R^3$, $R^4$, $R^5$, and $R^6$ are each independently selected from hydrogen, substituted or unsubstituted alkyl, and substituted or unsubstituted aryl;

$X^1$ is a halide, a hydride, or a formate ion; and
$X^2$ is a halide;
or

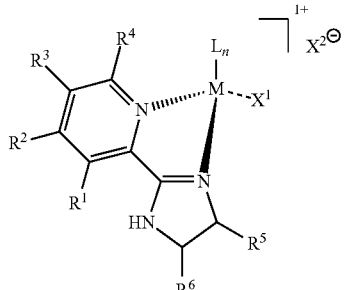

or a salt thereof, wherein:
  L is a neutral ligand or an anionic ligand;
  M is a metal or a metal ion;
  n is 0, 1, or 2;
  $R^1$, $R^3$, $R^4$, $R^5$, and $R^6$ are each independently selected from hydrogen, substituted or unsubstituted alkyl, and substituted or unsubstituted aryl;
  $R^2$ is hydrogen, substituted or unsubstituted alkyl, substituted or unsubstituted aryl, $N(CH_3)_2$, $NH_{12}$, OH, $CH_3O$, $C_2H_5O$, $CH_3$, F, I, $CF_3$, CN, or $NO_2$; and
  $X^1$ is a halide, a hydride, or a formate ion
  contacting formic acid, a formate, or a combination of formic acid and a formate, with said catalyst, wherein the contacting step is performed under conditions for producing hydrogen, and wherein the contacting step produces one or more additional gases.

10. The method of claim 9, wherein the one or more additional gases comprises carbon dioxide and is substantially free or free from carbon monoxide.

11. The method of claim 9, wherein the formate comprises sodium formate, potassium formate, or lithium formate.

12. The method of claim 9, wherein the contacting step is performed in the presence of one or more solvents, said one or more solvents being substantially free from organic solvents.

13. The method of claim 9, wherein the contacting step is performed in the presence of one or more solvents, wherein the one or more solvents is selected from an aqueous solvent, water, methanol, and combinations thereof.

14. The method of claim 9, wherein the contacting step is substantially free from amines.

15. The method of claim 9, wherein the catalyst has a turnover number from about 500 to about 2,000,000.

16. The method of claim 9, wherein the contacting step is performed at room temperature.

17. The method of claim 9, wherein the catalyst has a turnover frequency of from about 5,000 $h^{-1}$ to about 100,000 $h^{-1}$.

18. The method of claim 9, wherein the catalyst has the following structure:

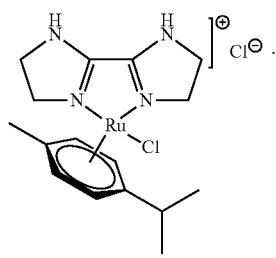

19. A method for generating electricity, comprising:
(a) providing:
a source of hydrogen comprising formic acid, a formate, or a combination thereof,
a catalyst having one of the following structures:

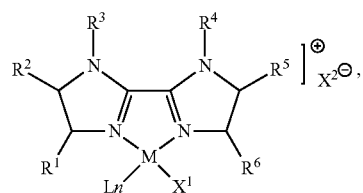

wherein:
L is a neutral ligand or an anionic ligand, wherein L is a substituted aryl;
M is a metal or a metal ion;
n is 0, 1, or 2;
$R^1$, $R^2$, $R^3$, $R^4$, R, and $R^6$ are each independently selected from hydrogen, substituted or unsubstituted alkyl, and substituted or unsubstituted aryl;
$X^1$ is a halide, a hydride, or a formate ion; and
$X^2$ is a halide;
or

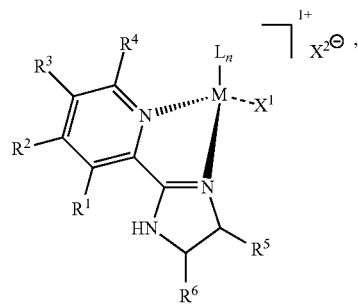

wherein:
L is a neutral ligand or an anionic ligand;
M is a metal or a metal ion;
n is 0, 1, or 2;
$R^1$, $R^3$, $R^4$, $R^5$, and $R^6$ are each independently selected from hydrogen, substituted or unsubstituted alkyl, and substituted or unsubstituted aryl;
$R^2$ is hydrogen, substituted or unsubstituted alkyl, substituted or unsubstituted aryl, $N(CH_3)_2$, $NH_2$, OH, $CH_3O$, $C_2H_5O$, $CH_3$, F, I, $CF_3$, CN, or $NO_2$; and
$X^1$ is a halide, a hydride, or a formate ion;
a reaction chamber; and
a fuel cell that generates electricity;
(b) delivering said hydrogen source and said catalyst to the reaction chamber, and wherein a catalyzed reaction in the reaction chamber causes the formic acid, formate or combination of formic acid and formate, to convert to hydrogen and carbon dioxide; and
(c) delivering the converted hydrogen to the fuel cell to generate electricity.

* * * * *